United States Patent
Otsmane et al.

(10) Patent No.: US 10,296,705 B2
(45) Date of Patent: May 21, 2019

(54) METHOD FOR DETERMINING TOLERANCE INTERVALS FOR DIMENSIONING A PART

(71) Applicant: SAFRAN AIRCRAFT ENGINES, Paris (FR)

(72) Inventors: Abdelkader Otsmane, Moissy-Cramayel (FR); Virgile Marguin, Moissy-Cramayel (FR); Nicolas Gayton, Malauzat (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 485 days.

(21) Appl. No.: 15/048,331

(22) Filed: Feb. 19, 2016

(65) Prior Publication Data
US 2016/0246917 A1    Aug. 25, 2016

(30) Foreign Application Priority Data
Feb. 20, 2015   (FR) .................... 15 51490

(51) Int. Cl.
G06F 17/50 (2006.01)
G06F 17/18 (2006.01)
G07C 3/14 (2006.01)

(52) U.S. Cl.
CPC .......... G06F 17/5086 (2013.01); G06F 17/18 (2013.01); G06F 17/50 (2013.01); G07C 3/14 (2013.01)

(58) Field of Classification Search
CPC ...... G06F 17/5086; G06F 17/50; G06F 17/18; G07C 3/14
See application file for complete search history.

(56) References Cited

U.S. PATENT DOCUMENTS

| | | | |
|---|---|---|---|
| 5,311,784 A * | 5/1994 | Girard | G01B 21/04 700/175 |
| 9,558,300 B2 * | 1/2017 | Jha | G06F 17/50 |

(Continued)

OTHER PUBLICATIONS

Anirban Basudhar et al. ("Design Tolerance Optimization using LS-OPT" https://www.dynamore.de/de/download/papers/2014-ls-dyna-forum/documents/optimierung/design-tolerance-optimization-using-ls-opt/view, retrieved on Jul. 2, 2018.) (Year: 2014).*

(Continued)

*Primary Examiner* — Saif A Alhija
*Assistant Examiner* — Joshua E. Jensen
(74) *Attorney, Agent, or Firm* — Oblon, McClelland, Maier & Neustadt, L.L.P.

(57) ABSTRACT

A method determines tolerance intervals for a set of dimensions of a part. The tolerance intervals are defined so that a part, the dimensions of which are included in the intervals, observes a set of constraints with a determined failure probability. The method includes generating a separation function for each constraint to be observed, each function being able to indicate whether a given dimensioning of a part meets or not the corresponding constraint. The method also includes iteratively building a set of increasingly larger tolerance intervals at each iteration, by the separation functions, whether the dimensionings included in the intervals observe the constraints with a failure probability of less than the failure probability.

11 Claims, 4 Drawing Sheets

(56) References Cited

U.S. PATENT DOCUMENTS

2009/0164177 A1* 6/2009 Hamazoe ............... G06F 17/50
703/1
2012/0209553 A1* 8/2012 Doytchinov ......... G01B 21/047
702/81

OTHER PUBLICATIONS

Echard, B., N. Gayton, and M. Lemaire. "AK-MCS: an active learning reliability method combining Kriging and Monte Carlo simulation." Structural Safety 33.2 (2011): 145-154. (Year: 2011).*
Sheldon, Karl Edward. Analysis methods to control performance variability and costs in turbine engine manufacturing. Diss. Virginia Tech, 2001. (Year: 2001).*
Shiu, B. W., Apley, D. W., Ceglarek, D., & Shi, J. (2003). Tolerance allocation for compliant beam structure assemblies. IIE transactions, 35(4), 329-342. (Year: 2003).*
Dubourg, Vincent, Bruno Sudret, and Franois Deheeger. "Metamodel-based importance sampling for structural reliability analysis." Probabilistic Engineering Mechanics 33 (2013): 47-57. (Year: 2013).*
Beaucaire, Paul, et al. "Statistical tolerance analysis of over-constrained mechanisms with gaps using system reliability methods." Computer-Aided Design 45.12 (2013): 1547-1555. (Year: 2013).*
Huang, Wenzhen, Tirawat Phoomboplab, and Dariusz Ceglarek. "Process capability surrogate model-based tolerance synthesis for multi-station manufacturing systems." IIE Transactions 41.4 (2009): 309-322. (Year: 2009).*
French Search Report dated Feb. 10, 2016 in French Patent Application No. 1551490 with Written Opinion and English Translation of Categories.
Matheron, G., "The Intrinsic Random Functions and Their Applications", *Ad. Appl. Prob.*, vol. 5, pp. 439-468 (1973).
Echard, B., et al., "AK-MCS: An active learning reliability method combining Kriging and Monte Carlo Simulation," *Structural Safety*, vol. 33, pp. 145-154, (2011).
Gayton, N., "Méthodes probalistes pour la conception mécanique—Application a la fatigue des structures et a l'analyse des tolerances" Nov. 23, 2012, pp. 1-172.

* cited by examiner

| epmax_00 | chord_00 | setting_00 |
|---|---|---|
| epmax_20 | chord_30 | setting_30 |
| epmax_60 | chord_60 | setting_70 |
| epmax_100 | chord_85 | setting_100 |
| | chord_100 | |

METHOD FOR DETERMINING TOLERANCE INTERVALS FOR DIMENSIONING A PART

FIELD OF THE INVENTION

The invention relates to a method for optimum determination of tolerance intervals for a set of dimensions of a part.

The invention is notably applied in the qualification of parts with complex geometry, notably in the field of aeronautics. The invention in particular applies to the qualification of tolerance intervals for blades of a turbine engine.

STATE OF THE ART

During the design of a mechanical part, it is standard to determine rated values for the whole of the dimensions of the part one seeks to design.

These values are defined as guaranteeing optimum operation of the part towards a set of dimensioning criteria of multiple natures, such as for example cost, mechanical strength, aerodynamic performances, mass, etc.

These rated values are therefore the optimum values prescribed for the dimensions of the parts to be manufactured.

Now, the manufacturing process necessarily generates geometrical deviations with respect to these rated values, according to dispersions which are difficult to control.

It is then necessary to be able to know whether the parts having such deviations are also acceptable relatively to these criteria, and therefore to define optimum variation ranges relatively to the rated values which give the possibility of ensuring with a given probability this admissibility while reducing manufacturing costs.

These variation ranges relatively to the rated values are tolerance intervals. These intervals are defined in such a way that a representative sample of parts produced, the dimensions of which are included in the set of tolerance intervals corresponding to the whole of the dimensions of the part, has a determined probability of failure—i.e. a probability of not satisfying at least one of the constraints.

The determination of tolerance intervals is a parametric optimization problem under constraints amounting to minimizing a cost function which decreases when globally the size of the tolerance range increases, in order to facilitate production of the part and to reduce the costs thereof, while guaranteeing that the dimensionings included in this tolerance area has a failure probability towards constraints of less than the maximum probability set by the designer.

Now, the evaluation that a given dimensioning of a part meets the whole of the design constraints requires mechanical modeling of the part and a large number of calculations for checking its behavior, for example mechanical, aerodynamic behavior, etc.

This is particularly true for parts with a complex geometry and which have to meet a significant number of constraints, as this is notably the case of turbine engine blades.

Consequently, the resolution of the parametric optimization problem in order to determine the optimum tolerance intervals is a process which is very expensive in terms of computing time (and much more than a simple search for rated dimensions) because of the multiple iterations required and with a high computation cost (due to the simulation). Indeed, as the optimization requires the exploration of the whole of the possible values in terms of part dimensions, a large number of computations will be carried out.

Therefore there exists a need for a method for determining tolerance intervals for dimensions of a part which is less costly in terms of computation time and compatible with design delays.

PRESENTATION OF THE INVENTION

The object of the invention is to overcome at least one of the drawbacks mentioned herein before. Notably, the object of the invention is to propose a method for determining optimum tolerance intervals for a set of dimensions of a part which both reduces the manufacturing costs and the computation times applied for searching for these intervals.

In this respect, the object of the invention is a method for determining tolerance intervals for a set of dimensions of a part, said tolerance intervals being defined so that a part, the dimensions of which are included in said intervals, observed a set of constraints with a determined failure probability p, the method being characterized in that it comprises the following steps:
  generating a separation function for each constraint to be observed, each function being able to indicate whether a given dimensioning of a part either meets or not the corresponding constraint, and
  iteratively building a set of increasingly large tolerance intervals by testing, at each iteration, by means of the separation functions, whether the dimensionings included in said intervals observe the constraints with a failure probability of less than the probability p.

Advantageously, but optionally, the method according to the invention further comprises at least one of the following features:
  the step for building the set of tolerance intervals comprises the iterative application of steps of:
    a) globally enlarging the current tolerance intervals relatively to the preceding tolerance intervals so that there exist more dimensionings included in the current intervals than in the preceding intervals,
    b) randomly drawing according to a multivariate Gaussian law centered on rated values of dimensions of the part, a plurality of dimensionings included in the set of current tolerance intervals,
    c) testing by means of the separation functions whether each dimensioning is acceptable with respect to the constraints,
    d) testing whether the percentage of unacceptable dimensionings relatively to the constraints is less than the failure probability p, and
    e) in the case of a positive test in step d), repeat steps a) to d)
  during the first iteration of the step for building tolerance intervals, each interval is reduced to a rated value determined from the corresponding dimension of the part.
  the method comprises, in the case of a negative test in step d), a step e') for re-iterating steps a) to d) by taking up again as preceding tolerance intervals the last tolerance intervals for which the percentage of unacceptable dimensionings relatively to the constraints is less than the failure probability p.
  step a) is applied by perturbing the ends of the preceding tolerance intervals symmetrically according to a Gaussian law.
  step a) further comprises at the end of the perturbation, the computation of the total volume of a hypercube for which the sides are formed by the sizes of the tolerance intervals, and the comparison of the volume of the hypercube relatively to that formed by the last intervals for which the percentage of unacceptable dimensionings relatively to the constraints is less than the failure probability p.

if the volume of the obtained hypercube is less than the one formed by the last intervals for which the percentage of unacceptable dimensionings relatively to the constraints is less than the failure probability p, step a) is reiterated by taking up again as preceding tolerance intervals, the last tolerance intervals for which the percentage of unacceptable dimensionings relatively to the constraints is less than the failure probability p.

the step for building tolerance intervals is stopped after a determined number of unsuccessful iterations defined by:

the volume of the current hypercube ($V_k$) is less than the volume ($V_{k0}$) of the last hypercube corresponding to the tolerance intervals for which the number of unacceptable dimensionings relatively to the constraints is less than the failure probability p, or the result of step d) is negative.

each constraint is modeled by a function, and the step (100) for generating separation functions comprises the application of steps consisting of:

forming a Monte-Carlo population with dimensionings of the part (110), initializing, for each constraint ($g_i$), a corresponding Kriging separator (120), and application in an iterative way, of steps consisting of:

determining (130) from the dimensionings of the Monte-Carlo population, the one for which the accuracy for estimating a constraint with the corresponding Kriging separator is minimum, and computing (140) for this dimensioning, the value of the whole of the constraint functions, and updating accordingly the Kriging separators, the part is a turbine engine blade.

The invention also relates to a computer program product, comprising code instructions for applying the method according to the preceding description, when it is executed by a processor.

The object of the invention is finally a method for manufacturing a turbine engine blade, comprising, for each manufactured part:

the measurement of the whole of the dimensions of the part, checking that each dimension is included in a corresponding tolerance interval, in which the tolerance intervals are determined by applying the method according to the preceding description, and if each dimension of the part is included in the corresponding tolerance interval, validation of the part, and if at least one dimension is not included in the corresponding tolerance interval, application of an additional processing operation on the part in order to determine whether the part is valid or not.

The proposed method solves the aforementioned problem of reducing the computing time during the elaboration of tolerance intervals by minimizing the number of modeling of a part for checking its observance of the constraints.

Indeed, these modeling, which are the most computer-intensive in terms of computation, are only applied for defining the separation functions for each constraint to be observed. Once these separation functions are generated, it is possible to test by a faster computation whether a given dimensioning meets the constraints, and this with accuracy.

These separation functions therefore allow testing of a large number of dimensionings within a limited time, and therefore maximization of the tolerance intervals for one part.

The proposed method advantageously applies to parts with complex geometry comprising an average, or even large number of geometrical dimensions and of constraints to be observed, like for example blades of a turbine engine.

DESCRIPTION OF THE FIGURES

Other features, objects and advantages of the invention will become apparent from the description which follows, which is purely illustrative and non-limiting, and which should be read with reference to the appended drawings wherein.

DETAILED DESCRIPTION OF AT LEAST ONE EMBODIMENT OF THE INVENTION

Figure 1A:
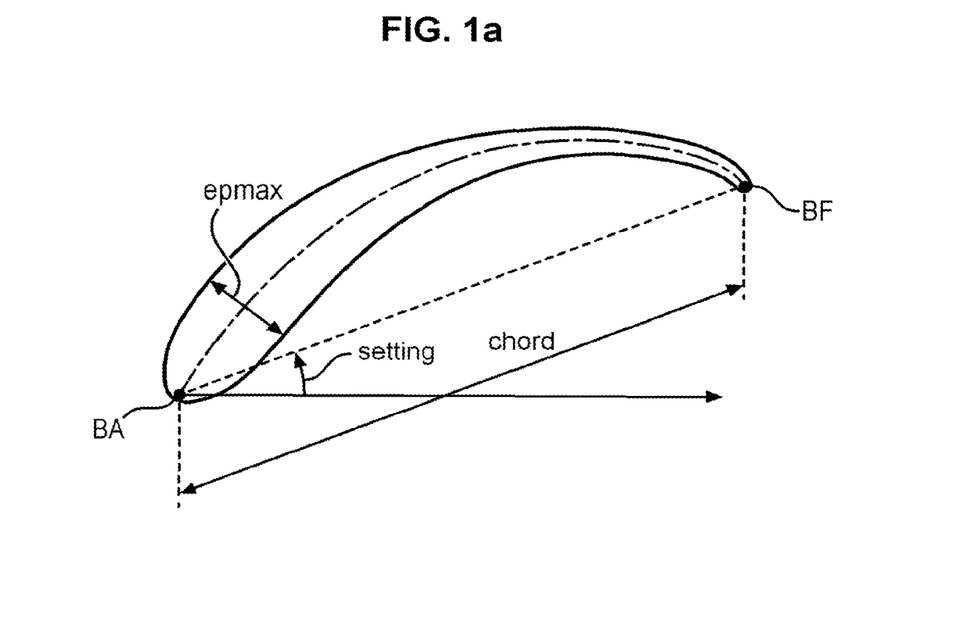
FIG. 1a illustrates a sectional view of the profile of a blade of a turbine engine, with a few characteristic dimensions which may enter the parametric optimization of the tolerance intervals.

With reference to FIG. 1a, an exemplary part and corresponding design variables are illustrated, for which it is sought to determine tolerance intervals. The design variables may be measurements, for example length, width, thickness, height, and/or angles.

Subsequently, these variables are described under the generic term of dimensions, a set of given values for each design variable consisting of an exemplary dimensioning of the part.

In the non-limiting example of FIG. 1a, the part is a turbine engine blade, seen as a section at a given height.

Figure 1B:
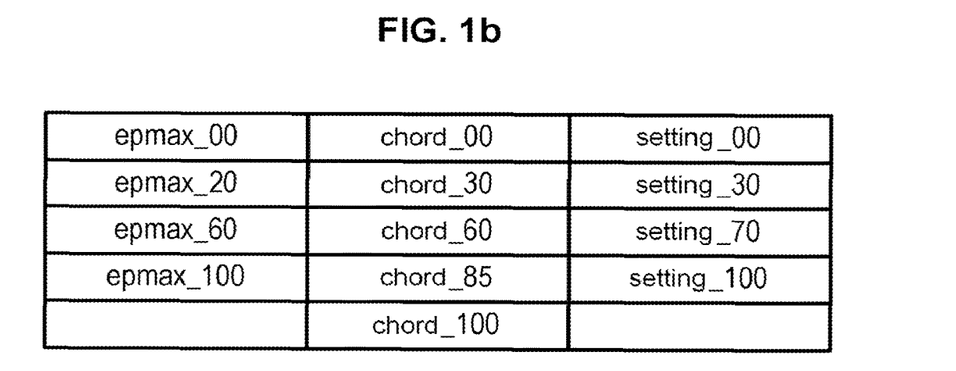
FIG. 1b is a table giving an example of dimensions in the design of a turbine engine blade, at different heights of the blade (0%, 20%, 30%, 60%, 70%, 85%, 100%)

FIG. 1b gives an example of dimensions for which is sought a determination of the tolerance intervals. These dimensions are for example a maximum thickness, a chord dimension (i.e. the segment connecting the leading edge to the trailing edge of a blade) and a setting angle (the angle between the chord and the axis of revolution of the turbine engine in which the blade is positioned) of the blade, for sections located at different heights of the blade, the figure associated with each variable in FIG. 1b designating the height of the section of the blade in a percentage of the total height.

According to this example, there exist therefore 13 associated dimensions each with a determined tolerance interval.

Further, each dimension is associated with a rated value obtained at the end of a design process not taking into account the variabilities of the dimensions inherent to the manufacturing process.

In the following the dimensions for which optimum tolerance intervals are sought, are noted as $x_i$, i being an index varying between 1 and N wherein N is the number of design dimensions of a part (N=13 according to the preceding example), $x_i^{rated}$ the corresponding rated values $IT_i = [x_i^{min}, x_i^{max}]$ the corresponding tolerance intervals.

Method for Determining Tolerance Intervals

A method for determining tolerance intervals $IT_i$ will now be described for a set of dimensions $x_i$ of a part. This method is applied by a processing unit (not shown), for example a computer, comprising processing means, for example a processor, configured for executing a suitable program.

The tolerance intervals are defined as $IT_i$ so that the dimensionings of parts included in all the intervals have to observe a set of n constraints with a failure probability p set by the designer, the failure probability being defined as the probability that one dimensioning does not meet at least one of the constraints.

By again taking the preceding example of a turbine engine blade, the set of constraints to be observed may for example be defined as follows:
- A mass less than a determined maximum mass,
- Displacement of a point induced by operating forces, less than a determined threshold displacement,
- Rigidity greater than a certain value,
- Aerodynamic constraints,
- A set of mechanical constraints less than a set of threshold values (for example a maximum Von Mises stress at the blade head),
- Dynamic frequencies located in an acceptable range, non-coinciding with respect to the motor harmonics, etc.

The probability p (therefore comprised between 0 and 1) is set by the designer, preferably less than 0.1, and advantageously less than 0.01.

Each constraint is associated with a mathematical function modelling it, called $g_i$, $g_i : x \in \mathbb{R}^N \rightarrow \mathbb{R}$ (i=1, ..., n), characterized by a limiting state $g_i=0$ corresponding to a boundary beyond which a dimensioning no longer meets the corresponding constraint.

For example, a function $g_i$ evaluated in a first dimensioning is negative if the dimensioning does not observe the constraint and positive if the dimensioning observes it.

The goal is therefore to optimize the tolerance intervals with view to minimizing the production costs. This may be reformulated mathematically as follows:
Find $(IT_1, \ldots, IT_n)$, such that:

$$\begin{cases} (IT_1, \ldots, IT_n) = \mathrm{argmin}(f(IT_1, \ldots, IT_n)) \\ \text{under } p \le p_0 \end{cases}$$

wherein:
- $f(IT_1, \ldots, IT_n)$ refers to a cost function associated with tolerance intervals, i.e. a function to be minimized (generally this function is inversely proportional to the tolerance intervals); for information, it may be expressed as:

$$f(IT_1, \ldots, IT_n) = \sum_{i=1}^{n} \alpha_i * IT_i$$

and $\alpha_i$ is a weighting coefficient, for example the sum of the $\alpha_i$ may be equal to 1,
- IT refers to a measurement of the tolerance interval (normalized) associated with each dimension,
- p is the probability of not observing at least one of the imposed constraints (with the assumption that the constraints are independent);
- $p_0$ is a maximum failure probability which should not be exceeded.

Figure 2:
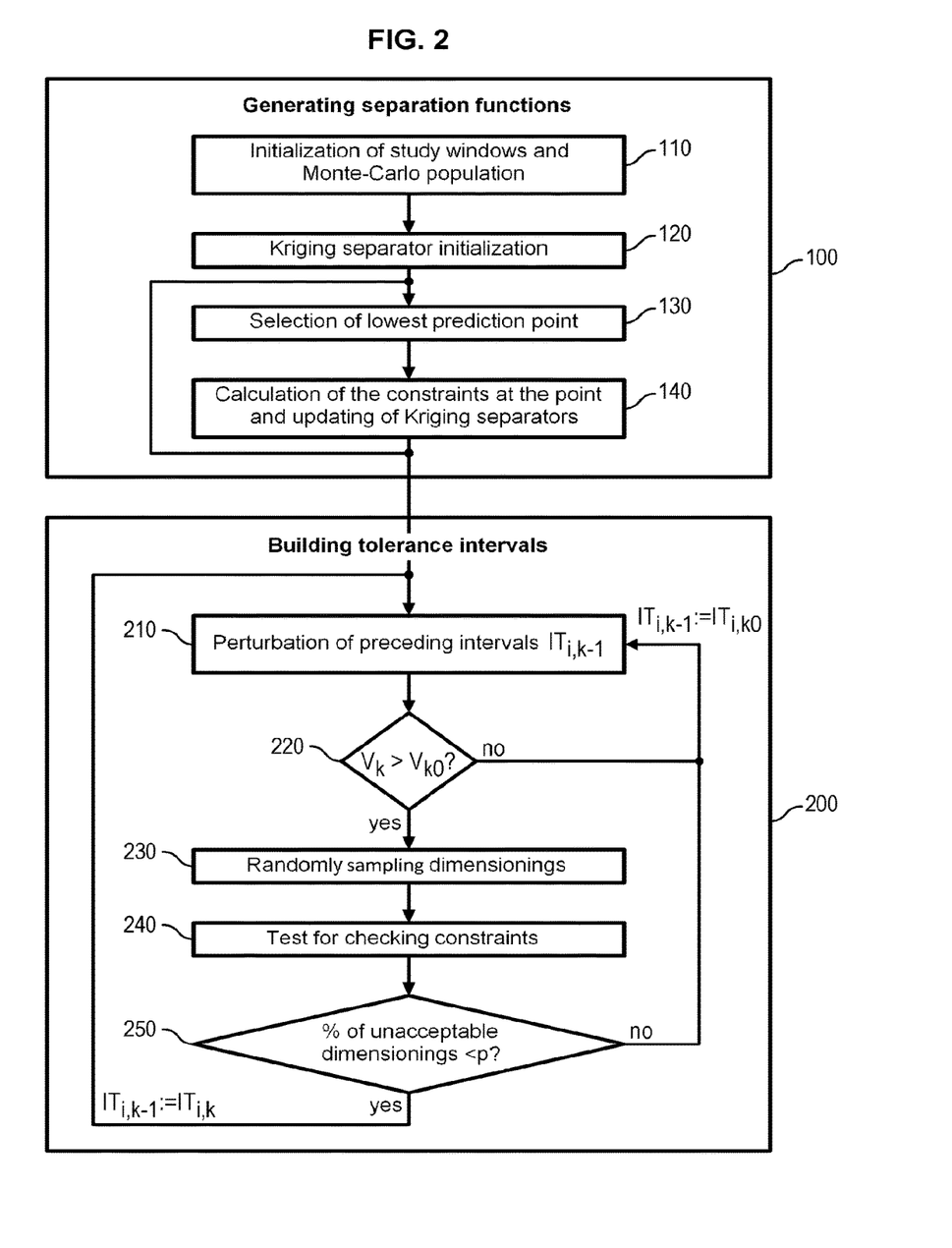
FIG. 2 illustrates the main steps of a method for determining tolerance intervals according to an embodiment of the invention.

The method for determining tolerance intervals, schematically summarized in FIG. 2, comprises two main steps.

The first step is a step 100 for generating a set of separation functions, comprising as many separation functions as there are constraints to be observed.

Each separation function gives the possibility of indicating, for a given dimensioning, whether this dimensioning meets the constraint associated with the separation function, i.e. it allows classification of the points of $\mathbb{R}^n$ on one side or on the other of the limiting state defined by $g_i=0$, for each constraint function $g_i$, and this without any computation cost unlike the conventional evaluation, by mechanical computations, that a part meets these constraints.

According to a preferred embodiment of step 100, the separation functions are Kriging separators, generated by applying a so called AK-MCS strategy described in the publication of B. Echard, N. Gayton and M. Lemaire: "AK-MCS: an Active learning reliability method combining Kriging and Monte-Carlo Simulation", Structural Safety, Vol. 33, pages 145-154, 2011, and which comprises the following sub-steps.

The step 100 first comprises an initialization 110 of the population being used for generating Kriging separators.

During this initialization 110, study windows $[X_i^{min}, X_i^{max}]$ are defined for each dimension $x_i$. A study window corresponds to the largest interval in which may be comprised a dimension $x_i$, independently of observance of the constraints $g_i$.

Step 110 then comprises the generation of a Monte-Carlo population according to a uniform law of dimensionings $(x_1, \ldots, x_N)$, each element of which is comprised in the corresponding study window (the size of this population being of the order of a few tens of thousands of points).

The step 100 then comprises a step of initializing Kriging separators 120. This step first comprises the evaluation of each constraint function $g_i$ for a set of included dimensionings, each dimension of which is included in the corresponding study window.

In this respect, the set of dimensionings may stem from an initial experimental plane of the designer of the object to be dimensioned (for example a plane of the Latin Hypercube type with a given size depending on the number of dimensions at play), i.e. a set of k dimensionings $(x_1^j, \ldots, x_N^j)_{j=1 \ldots k}$ already available to the designer.

Alternatively, the set of dimensionings is generated from the Monte-Carlo population generated in step 110. A set of k vectors $(x_1^j, \ldots, x_N^j)_{j=1 \ldots k}$ such that each $x_i^j$ is included in the corresponding study window $[X_i^{min}, X_i^{max}]$, k being of the order of 5 to 10 times the number of dimensions is then randomly sampled from this population.

Next, the constraints $g_i$ are computed in these k vectors, by directly calling the simulation models. This then gives the possibility of producing a Kriging of the values of the constraint functions $g_i$ on the set of dimensionings of the Monte-Carlo population from the points $x^j$ for which the constraints were calculated. Kriging is a known interpolation method for example described in the publication of G. Matheron, "The intrinsic random functions and their applications", Adv Appl Probab 1973; 5(3): 439-68.

At the end of this step 120, a Kriging separator $\mu_i$ is obtained for each constraint, the separator indicates an estimation of the value of the corresponding constraint $g_i$ in a given dimensioning.

However, taking into account the small number of points having been used for elaborating separators, the latter are of rather poor quality and do not allow accurate determination if a dimensioning meets these constraints or not. The following steps of the method aim at improving the quality of the separators.

To do this, steps 130 and 140 are applied iteratively. Step 130 comprises, for each dimensioning $x^j$ of the Monte-Carlo population, the evaluation of the whole of the separators relative to the constraints $g_i$ in order to infer therefrom, for each of them:

The predictor or Kriging separator $\mu_i(x^j)$, i.e. the estimation of the value of $g_i$ at $x^j$, and The Kriging variance $\sigma_i^2(x^j)$, i.e. the minimum of the mean squared error between $\mu_i(x^j)$ and $g_i(x^j)$.

These elements are computed according to the publication mentioned herein before, in which the predictor is $\hat{G}(x)$.

Once these elements are computed, the criterion $U_i(x^j)=|\mu_i(x^j)|/\sigma_i^2(x^j)$ is inferred therefrom for each constraint $g_i$.

For each individual $x^j \in \mathbb{R}^N$ of the Monte-Carlo population, only the criterion $U_i(x^j)$ of the constraint providing the smallest prediction $\mu_i(x^j)$ in absolute value is retained (the constraints having been normalized beforehand): this criterion is noted as $U(x^j)$.

Next, from among all the points of the Monte-Carlo population, only the point $x^i$ is retained providing the smallest criterion U, meaning the greatest probability of making a sign mistake at this location.

In step 140, all the constraints are computed at the point $x^j$ determined at the end of step 130, and the Kriging separators are updated accordingly. At each iteration, the Kriging separators are therefore enriched with additional information and made more accurate.

This enrichment, applied during steps 130 and 140 is iterated until 99% of the values of U for the remaining population of the uniform Monte-Carlo sampling are greater than 2. These empirical values stem from experiments made during the validation of the AK-CMS method of the publication mentioned herein before and allowing optimum classification of the points of the population of the $x^j$ towards the acceptability boundary of each constraint function $g_i$=0.

At the end of step 100, the result thereof is a representative population from among the set of possible dimensionings in the study windows for which the Kriging predictor is evaluated and for which one therefore has a very good estimation of the observance of the constraints.

Step 100 is relatively costly in computation time because of the application, in steps 120 and 140, of computations resorting to simulation models for specifically computing the values of the constraints in a dimensioning.

However, this step then allows definition of the largest tolerance intervals without any additional costly computations, which in turn allow easy determination of the acceptable parts and the parts requiring additional verification, as indicated hereafter.

The method for determining the tolerance intervals then comprises a second main step 200 utilizing the separation functions determined in step 100.

This step 200, is a step of building, by an iterative process, tolerance intervals minimizing a cost function associated with the manufacturing costs of the part (this cost being reduced with larger tolerance intervals), by testing at each iteration, whether a number of randomly drawn dimensionings in these tolerance intervals meets the constraints with a failure probability of less than the determined probability p.

The set of tolerance intervals $IT_i$, i=1, . . . , N forms a hypercube of dimension N defined by its centre, in this case the vector of dimension N with the rated design dimensions $(x_1^{rated}, \ldots, x_N^{rated})$ and with a vector of dimension N $(t_1, \ldots, t_N)$ defining the size of the hypercube according to each variable $x_i$.

The application of step 200 is illustrated in a simplified way in FIGS. 3a to 3d in 2 dimensions, i.e. in the case of a two dimensional part, and by selecting two constraints to be observed. The illustrated curves schematically illustrate the separators to be observed, and the bright frame at the centre represents the study domain formed by the study windows for both dimensions (i.e. the tolerance intervals).

Figure 3A:
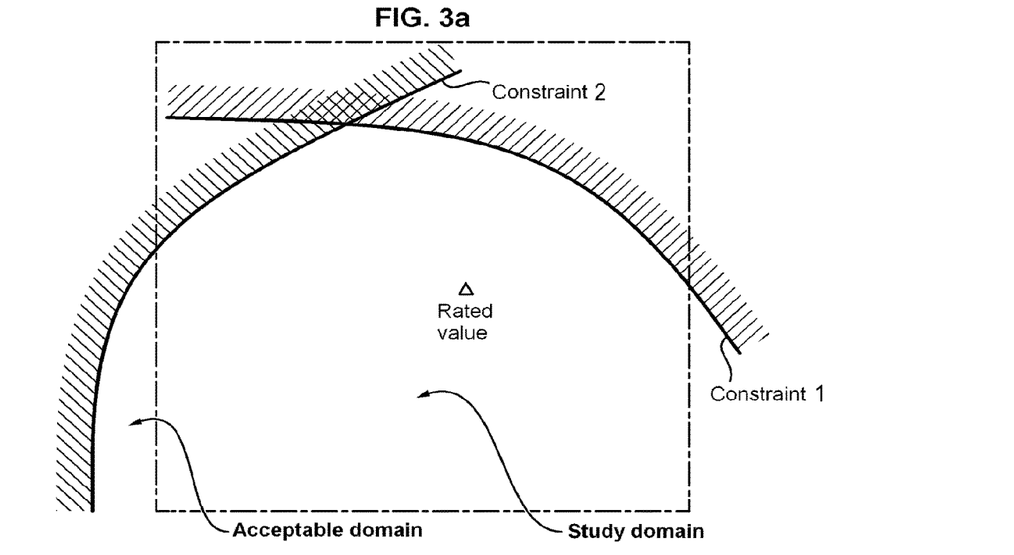
FIGS. 3a to 3d schematically illustrate the application of the step for building tolerance intervals of the method of FIG. 2.

With reference to FIG. 3a, step 200 is initialized with, for each dimension $x^i$, tolerance intervals reduced to the rated values $x_i^{rated}$.

Next, the step 200 comprises the iterative application of the following steps.

Figure 3B:
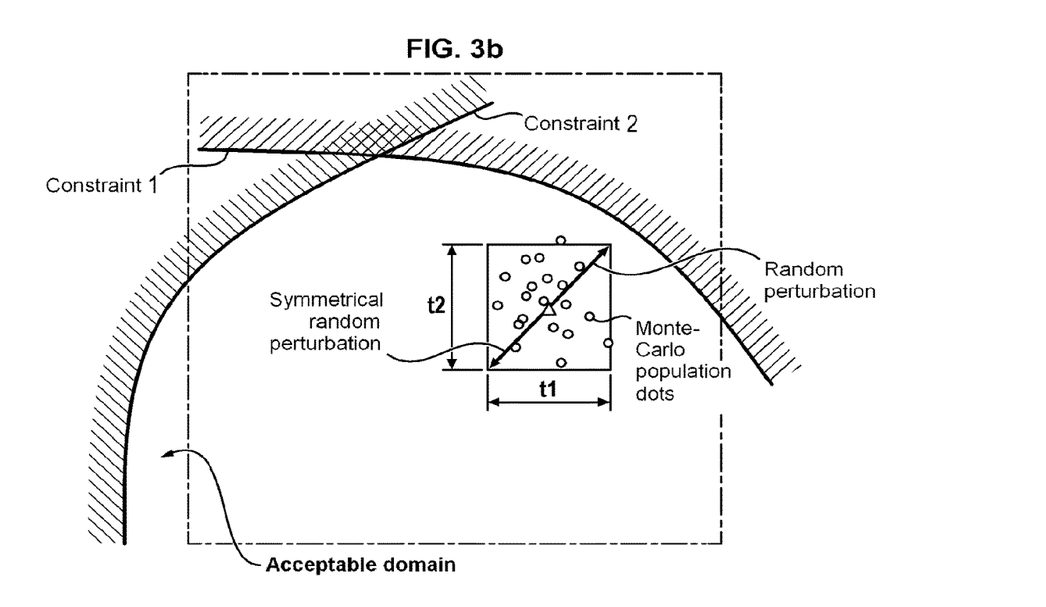
Figure 3C:
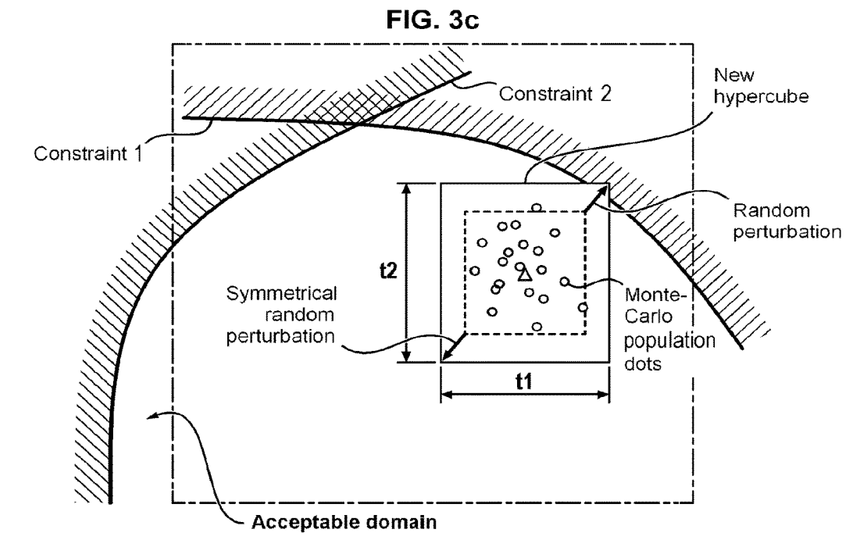
Figure 3D:
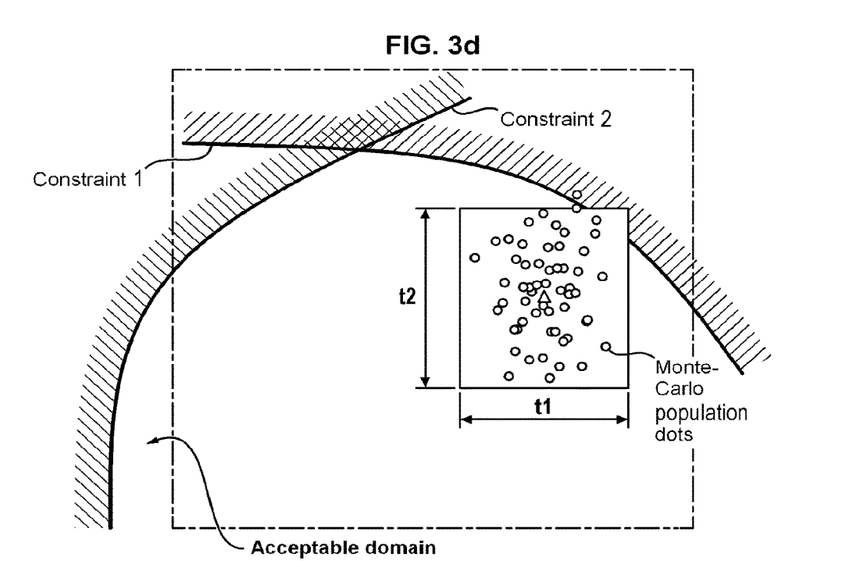

With reference to FIG. 3b, during a sub-step 210, each preceding tolerance interval—i.e. stemming from a preceding iteration or in the case of a first iteration, the corresponding rated value—is randomly and symmetrically perturbed—in order to retain the rated dimensions as the central point of the hypercube, as visible in FIG. 3b—according to a Gaussian law.

The law is centered with a small standard deviation with respect to the size of the acceptable domain for the constraint functions. According to an advantageous embodiment, the perturbations along the directions of the design space are standardized so as not to favor one dimension in particular, and the perturbation law is of the normal type with a very small perturbation, for example of 0.1, i.e. the distance between a corner of the initial hypercube and the same corner of the perturbed hypercube is of the order of 0.1 in the un-dimensioned space of the variables.

During the first iteration, as the tolerance intervals are reduced to rated values, these are the values which are perturbed according to a Gaussian law, until they form for each dimension an interval with a determined length $t_i$.

During the following iterations, these are the ends $x_i^{min}$ and $x_i^{max}$ which are perturbed, the perturbation corresponding to a standardized growth of the hypercube of a low amplitude in the case of the embodiment shown herein before.

At the end of this step, a hypercube with sides $t_i$ representing the length of the obtained tolerance intervals is obtained. This hypercube is illustrated in the simplified example of FIG. 3b as a rectangle of side $t_1$ for the interval corresponding to the first dimension and $t_2$ for the interval corresponding to the second one.

The obtained hypercube has to be increasingly great gradually with the iterations, since it is sought to increase the tolerance intervals so as to minimize the cost function of the optimization problem. In other words, at each iteration, there must be more dimensionings included in the current tolerance intervals than in the preceding intervals for which the failure probability p is observed.

In order to check this, the step 200 comprises a verification 220 that the hypercube obtained at the end of step 210 is larger than the last acceptable hypercube built earlier. This step 220 only takes place from the $2^{nd}$ iteration of the algorithm.

By acceptable hypercube, is meant a hypercube corresponding to tolerance intervals noted as $IT_{k0}$ for which the percentage of unacceptable dimensionings towards the constraints, computed during a step 250 described hereafter of a preceding iteration, is less than the failure probability p.

This may be the hypercube obtained in the preceding iteration but not necessarily, if this hypercube included a too large percentage of unacceptable dimensionings.

In order to carry out this verification 220, the volume $V_k$ of the current hypercube is computed and is compared with the volume $V_{k0}$ of the last acceptable hypercube with:

$$V_k = \prod_i t_{i,k}$$

wherein $t_{i,k}$ is the length of the current tolerance interval $IT_i$, i.e. of the iteration k.

In the case when the current hypercube has a smaller volume than the hypercube with which it was compared, the step 210 is repeated from the last acceptable hypercube.

In the case when the current hypercube has a larger volume than the preceding hypercube, the method then comprises step 230 during which points are randomly sampled in the hypercube, according to a multi-variant Gaussian law centered on the rated values of the dimensions. The randomly sampled points are as many dimensionings of the part.

Advantageously, the standard deviations of the dimensions $x_i$ forming the elements of the variance-covariance matrix of the Gaussian law used for the drawing are respectively equal to $t_i/6$, according to the 6-sigma approach commonly recognized.

The number of sampled dimensionings is at least equal to $10^{n+2}$ in order to estimate a failure probability of the order of $10^{-n}$.

Once the dimensionings have been randomly drawn, the method comprises a step 240 consisting of testing for each dimensioning, whether it meets the whole of the constraints to be observed.

To do this, the evaluations of each dimensioning with each of the separation functions respectively corresponding to each of the constraints to be observed, i.e. Kriging separators, stored in memory in step 100, are recovered.

This step is therefore fast to apply since it does not require generation of modeling of the part according to each of the dimensionings, before applying mechanical calculations for checking the observance of the constraints.

A dimensioning is considered as acceptable if it meets the whole of the constraints, and unacceptable if it does not satisfy at least one constraint.

Once all the dimensionings have been tested, the method comprises a step 250 for counting acceptable dimensionings from among the set of tested dimensionings, and for comparing the percentage of unacceptable dimensionings with the failure probability p to be observed.

If the percentage of unacceptable dimensionings is less than the required failure probability p, then the hypercube formed by the current tolerance intervals is considered as acceptable. In this case, the steps 210 to 250 are reproduced, by taking for preceding tolerance intervals those obtained at the end of this step 250, as schematically visible in FIGS. 3c and 3d (enlargement of the preceding hypercube for obtaining the current hypercube).

On the other hand, if at the end of step 250, the percentage of unacceptable dimensionings is greater than the failure probability p, then steps 210 to 250 are reproduced from the last hypercube for which the percentage of unacceptable dimensionings is less than the failure probability p—corresponding to the intervals $IT_{k0}$—or, in the case when there is no other iteration, by again taking the rated starting values.

Steps 210 to 250 are reproduced iteratively until a determined number of unsuccessful iterations, an unsuccessful iteration being defined by:

Either the current hypercube is smaller than the preceding hypercube, or

The percentage of unacceptable dimensionings is greater than the probability p.

Advantageously, the method comprises at least 50, for example 100 unsuccessful iterations before stopping, this number of iterations increasing the probability of having obtained optimum tolerance intervals.

The proposed method thus gives the possibility at each step of increasing the size of the tolerance intervals while rapidly making sure that dimensionings selected in these intervals have a lower probability so as to not meet one of the constraints. The result of this is maximized intervals guaranteeing observance of the imposed failure probability.

Once the tolerance intervals have been obtained for the whole of the dimensions of the part, the manufacturing of the part uses these tolerance intervals by measuring, for each manufactured part, the whole of its dimensions, and then by checking whether each of the dimensions is included in the corresponding tolerance interval.

If each dimension of a part is included in the corresponding tolerance interval, then the part is considered as valid.

If a dimension or more of the part is not included in the corresponding tolerance interval, this does not necessarily imply that the part is not valid. In order to determine it, the part is redirected towards a specific processing operation during which additional computations are applied.

The tolerance intervals defined herein before give the possibility of achieving significant production savings, since a larger number of parts is determined as being statistically valid during the manufacturing, and the processing operation involving the additional computation is applied for a more reduced number of parts.

The invention claimed is:

1. A method for determining tolerance intervals for a set of dimensions of a part, said tolerance intervals being defined so that one part for which the dimensions are included in said tolerance intervals observes a set of constraints with a determined failure probability p, the method comprising:

generating a separation function for each constraint to be observed, each function being able to indicate whether a given dimensioning of a part meets or not the corresponding constraint, and iteratively building a set of tolerance intervals increasingly large by testing, at each iteration, by the separation functions, whether the dimensionings included in said tolerance intervals observe the constraints with a failure probability below the probability p, wherein the step for building the set of tolerance intervals comprises an iterative application of the following steps:

a) globally enlarging current tolerance intervals relatively to preceding tolerance intervals so that there exist more dimensionings included in the current tolerance intervals than in the preceding tolerance intervals, b) randomly sampling according to a multivariate Gaussian law centered on rated values of dimensions of the part, a plurality of dimensionings included in the set of current tolerance intervals, c) testing, by the separation functions, whether each dimensioning is acceptable relatively to the constraints, d) testing whether a percentage of unacceptable dimensionings relatively to the constraints is less than the failure probability p, and e) in a case of a positive test in step d), repeat steps a) to d).

2. The method according to claim 1, wherein during the first iteration of the step for building the tolerance intervals, each tolerance interval is reduced to a determined rated value of the corresponding dimension of the part.

3. The method according to claim 1, further comprising, in a case of a negative test in step d), a step e') for reiterating steps a) to d) by taking up as preceding tolerance intervals last tolerance intervals for which the percentage of unacceptable dimensionings relatively to the constraints is less than the failure probability p.

4. The method according to claim 1, wherein the step a) is applied by perturbing ends of the preceding tolerance intervals symmetrically according to a Gaussian law.

5. The method according to claim 4, wherein the step a) further comprises at an end of the perturbing, computing a total volume of a hypercube, sides of the hypercube are formed by sizes of the tolerance intervals, and comparing the volume of the hypercube relatively to the hypercube formed by last tolerance intervals for which the percentage of unacceptable dimensionings relatively to the constraints is less than the failure probability p.

6. The method according to claim 5, wherein if the obtained volume of the hypercube is less than the one formed by the last intervals for which the percentage of unacceptable dimensionings relatively to the constraints is less than the failure probability p, step a) is reiterated by taking up again as preceding tolerance intervals the last tolerance intervals for which the percentage of unacceptable dimensionings relatively to the constraints is less than the failure probability p.

7. The method according to claim 6, wherein the step for building the tolerance intervals is stopped after a determined number of unsuccessful iterations defined by:

the volume of the current hypercube is less than the volume of the last hypercube corresponding to the tolerance intervals for which the number of unacceptable dimensionings relatively to the constraints is less than the failure probability p, or the result of step d) is negative.

8. The method according to claim 1, wherein each constraint is modeled by a function, and the step for generating separation functions comprises the application of the following steps:

forming a Monte-Carlo population of dimensionings of the part, initializing, for each constraint, a corresponding Kriging separator, and applying, iteratively, the following steps:

determining, from among the dimensionings of the Monte-Carlo population, the dimensioning for which the estimation accuracy of a constraint by the corresponding Kriging separator is minimum, and computing, for the determined dimensioning, a value of a whole of the constraint functions, and updating the Kriging separators accordingly.

9. The method according to claim 1, wherein the part is a turbine engine blade.

10. A non-transitory computer readable medium storing a program comprising code instructions that, when executed by a processor, cause the processor to execute the method according to claim 1.

11. A method for validating a manufactured turbine engine part, comprising, for each manufactured part:

measuring the whole of the dimensions of the part, verifying that each dimension is included in a corresponding tolerance interval, wherein the tolerance intervals are determined by applying the method according to claim 1, and if each dimension of the part is included in the corresponding tolerance interval, validating the part, and if at least one dimension is not included in the corresponding tolerance interval, applying an additional processing operation on the part in order to determine whether the part is valid or not.

* * * * *